Jan. 28, 1958    H. W. PILCHER ET AL    2,821,061
HARVESTER PICKUP ATTACHMENT
Filed Feb. 7, 1955
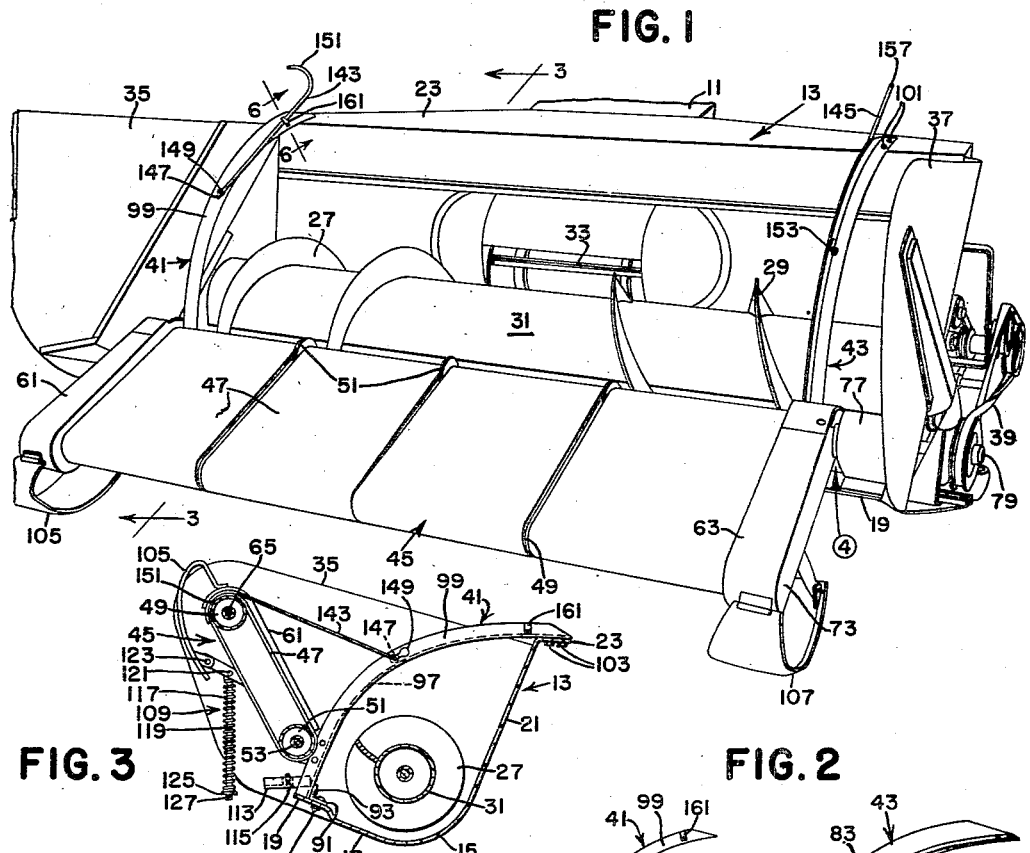
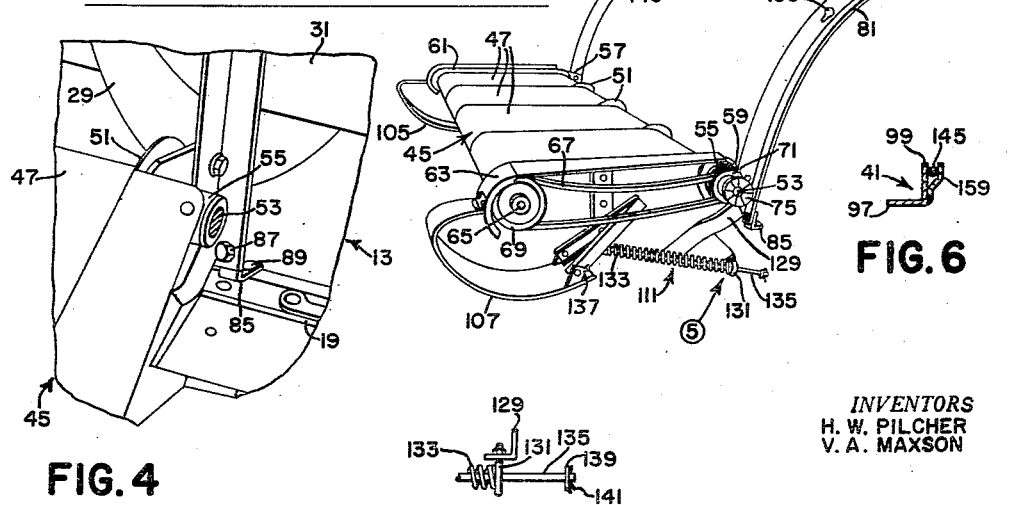
INVENTORS
H. W. PILCHER
V. A. MAXSON 2,821,061
HARVESTER PICKUP ATTACHMENT Harold W. Pilcher and Vernon A. Maxson, Moline, Ill., assignors to Deere & Company, Moline, Ill., a corporation of Illinois Application February 7, 1955, Serial No. 486,602

8 Claims. (Cl. 56—364)

This invention relates to a pickup attachment for harvesters and more particularly to an improved and integrated attachment structure whereby the pickup attachment may be readily installed on or removed from a harvester of conventional construction.

A typical harvester has a header platform including a forward or leading edge on which is mounted a sickle for cutting standing grain as the machine advances. The platform has an upright rear wall or windshield, the platform being therefore in the form of a J in section. Means on the platform moves the crops either inwardly and then rearwardly or simply directly rearwardly for receipt and handling by threshing mechanism associated with the header, the machine in that case being of the so-called combine type. However, in many instances it is desired to cut the crop and leave it lying on the ground without immediately threshing it, postponing the threshing operation until the crop has had a chance to cure. It is conventional practice to first windrow the crops and then pick them up with a conventional combine, the combine being modified, however, by the addition thereto of a pickup attachment, many types of which are familiar to those skilled in the art. It is desirable in the case of any pickup attachment that it be easily mounted on and dismounted from the harvester without materially modifying the harvester construction or design. What the pickup does is to extend ahead of the header so that the pickup fingers and belts serve to lift the previously harvested crop and carry it rearwardly over the now idle cutting mechanism, after which the elevating and threshing operations take place as before.

According to the present invention, the pickup attachment is provided in the form of a pickup which itself may be of conventional construction but which has novel mounting and dismounting means, preferably in the form of a pair of transversely spaced apart supports, each of which has a lower end portion and a rear upper end portion. These portions are provided respectively with means for rigid attachment to the leading and upper rear edges of the platform. The supports carry bearings and brackets for journaling a transverse shaft which not only serves to drive the pickup means but functions also as a pivot or hinge about which the pickup means may be swung from a forwardly projecting operating position to a generally upright idle or transport position. The supports function to brace the platform adequately to accommodate the extra weight of the pickup means. Further than that, the supports include retaining means for holding the pickup means in transport position.

Another object of the invention is to provide supports having depending arms by means of which floating resilient connections may be made to the pickup means. These connections are detachable so that when the pickup means is swung to its transport position, the floating or resilient means will not interfere with the necessary movement.

The foregoing and other important objects and desirable features inherent in and encompassed by the invention will become apparent as a preferred embodiment of the invention is disclosed in detail in the following specification and accompanying sheet of drawings, the several figures of which will be described immediately below.

Fig. 1 is a perspective view, largely from the front, showing the harvester platform with the novel pickup attachment mounted thereon.

Fig. 2 is a perspective view, from a different angle, showing the pickup attachment per se, the pickup-retaining means having been omitted from the figure in the interests of clarity.

Fig. 3 is a sectional view, on a slightly reduced scale, as seen generally along the line 3—3 of Fig. 1, illustrating both the harvester platform and the pickup means elevated to their transport positions.

Fig. 4 is a fragmentary perspective view, with portions removed and another portion shown in section, illustrating structure designated by the arrow bearing the encircled numeral 4 in Fig. 1.

Fig. 5 is an enlarged fragmentary elevational view illustrating the structure designated by the arrow bearing the encircled numeral 5 in Fig. 2.

Fig. 6 is a fragmentary sectional view, on a somewhat enlarged scale, as seen along the line 6—6 of Fig. 1.

The basic harvester structure chosen for the purposes of illustration will be seen to include the forward part of a combine, designated generally by the numeral 11, ahead of which is a header or platform 13 of not unconventional construction. As best shown in Fig. 3, the platform is transversely elongated—that is, it has its width transverse to the line of advance—and is in the form of a J in section, from which it follows that the intermediate portion of the platform is in the nature of a trough 15 having a forwardly extending bottom 17 terminating in a transverse front or leading edge 19 and an upright rear wall 21 terminating at its top in a transverse rear or upper edge 23. In the operation of the machine without the pickup attachment as illustrated here, standing grain is cut by suitable cutting mechanism (not shown) commonly carried by the leading edge 19. The cut grain is handled by appropriate conveyor means, here in the form of oppositely wound auger sections 27 and 29 on a central auger core 31. The auger functions to move the crops inwardly to form a relatively narrow stream which is conveyed upwardly and rearwardly to the combine part 11 by a conveyor, portions of which are visible here at 33.

Right- and left-hand side sheets 35 and 37, respectively, complete the platform or header 13. The expressions "right" and "left" are used with reference to the position of an observer standing behind the machine and facing forwardly.

Appropriate drive mechanism, designated in its entirety by the numeral 39, derives its power in the first instance from the combine (in a manner not shown) and serves to drive not only the auger but also the pickup attachment, as will presently appear.

The pickup attachment is shown by itself in Fig. 2 and comprises, briefly, a pair of transversely spaced apart or right- and left-hand supports 41 and 43, respectively, and pickup means 45. The pickup means may be of any conventional construction, here shown as comprising a plurality of belts 47 trained about front and rear rollers 49 and 51.

The rear rollers 51 are coaxially alined and fixed to a transverse input shaft 53, right- and left-hand end portions of which are appropriately journaled in bearings, as at 55 (Fig. 4), mounted in brackets 57 and 59 (Fig. 2).

The pickup means 45 is delineated at its right- and left-hand ends by structural frame elements 61 and 63, respectively, which serve to space the rear roller shaft 53 from a front shaft 65 on which the front rollers 49 are mounted, it being understood that the shaft 65 is appropriately journaled in bearings (not shown) in the elements 61 and 63. A drive belt 67 interconnects front and rear sheaves 69 and 71 that are fixed respectively to the front and rear shafts 65 and 53, the belt serving to transmit drive between the shafts rather than having the drive transmitted by the pickup belts 47.

As best seen in Fig. 1, the left-hand element 63 affords an enclosure for the belt 67 and sheaves 69 and 71. This enclosure has an end wall 73 which has been removed in Figs. 2 and 4 in the interests of clarity. Fig. 2 shows that the terminal end of the rear roller shaft 53 is in the form of one half of a clutch or coupling, as at 75, the other half of which is not shown, being enclosed in a shield 77. Nevertheless, it will be understood that the coupling or clutch including the portion 75 serves as a power-transmitting connection between the rear roller shaft 53 and an input shaft 79 forming part of the drive 39. The details of the drive are not important and are therefore not illustrated more elaborately.

The lower front end portion of the left-hand support 43 has means thereon for rigid affixation of that end to the proximate portion of the leading edge 19 of the platform 13. As will be seen, the support 43 is preferably in the form of an angle or otherwise having an L-shaped section, whereby the support has a transverse flange 81 and an upright flange 83. The means for affixing the lower end of the support 43 to the front edge 19 of the platform 13 includes an angle member 85 secured to the lower end of the support 43 as by a bolt 87 (Fig. 4). A second bolt 89 secures the member 85 to the leading edge 19. Similar structure is provided for the lower front end portion of the right-hand support 41, there being visible in Fig. 3 elements corresponding respectively at 91, 93, and 95, to the elements 85, 87, and 89. The support 41 is of L-shaped section and therefore has transverse and upright flanges 97 and 99.

Securing means in the form of bolts 101 secures the upper rear end portion of the support 43 to the upper edge 23 of the platform 13. Similar securing means, such as bolts 103, accomplishes affixation of the upper rear end portion of the right-hand support 41 to the edge 23 of the platform.

From the description thus far, it will be apparent that the pickup attachment is readily attachable to and detachable from the platform. The supports 41 and 43 extend upwardly and rearwardly, being preferably of arcuate shape as shown. These supports, being so shaped, are clear of the auger 31 and do not interfere with its operation. At the same time, they add bracing strength between the front and rear edges of the platform, thus compensating for the additional weight of the pickup means 45. Further than this, the supports, being of L-shaped section, have appropriate flanges that lend themselves to ready receipt of simple securing means, such as those at 101 and 103 and those at 85—87—89 and 91—93—95.

The bearings in the brackets 57 and 59, in conjunction with the rear roller shaft 53, establish the shaft not only as a driving shaft but also as hinge or pivot means enabling the pickup means 45 to be swung from the forwardly projecting operating position of Fig. 1 to the generally upright transport position of Fig. 3. The pickup end elements 61 and 63 are equipped respectively with skids or shoes 105 and 107 which ride the ground during operation of the pickup. In addition to the shoes, the pickup means is resiliently or floatingly supported at each end as by right- and left-hand spring means 109 and 111, respectively. The floating mounting of the pickup means on the supports 41 and 43 includes, at the lower end of the right-hand support 41, a depending arm 113, from the free end of which projects an apertured bracket 115. The spring means 109 includes a coiled compression spring 117 loosely surrounding an elongated rod 119, the rod at one end being pivotally connected at 121 to linkage 123 mounted on the right-hand shoe 105. The other end of the rod is slidably received in the apertured bracket 115 on the arm 113. The spring 117 thus acts in compression between the point 121 and the face of the bracket 115, the rod projecting loosely through the bracket 115 and being held against escape by means of a washer and pin 125 and 127, respectively.

The left-hand spring means 111 is similarly constituted, the lower front end of the support 43 having rigid thereon a depending arm 129 from which projects laterally an apertured bracket 131. A coiled compression spring 133 loosely encircles a rod 135 and acts between the bracket 131 and linkage 137 like the linkage 123. Retention of the rod is accomplished by a washer 139 and a pin 141, the details of which appear in Fig. 5. The pin 141, like the pin 127, is removable, which permits removal of the washer and thereby allows the rod to escape from the bracket 131 when the pickup means 45 is lifted to the transport position of Fig. 3. The same thing occurs, of course, at the right-hand side of the structure. Since the parts are symmetrical, Fig. 5 will serve as a detailed illustration of what is involved at the right-hand end of the machine. When the spring means 109 and 111 are hanging from the pickup means in the transport position of the latter, the washers and pins may be restored to retain the springs 117 and 133 against loss.

A pair of hooked retaining rods 143 and 145, respectively, comprise right- and left-hand retaining means operative with respect to the transport positioning of the pickup means as shown in Fig. 3. The rod 143 has a first end or part headed or otherwise configured, as at 147, for receipt by pivot means afforded by a keyhole slot 149 in the upright flange 99 of the right-hand support 41. Thereby, the rod 143 may be swung from its position of Fig. 1, which may be termed a storage position, to a retaining position as shown in Fig. 3, the free end of the rod having a relatively large hooked portion 151 which hooks over the proximate portion of the pickup means 45 to hold the pickup means in its raised or transport position.

The rod 145 has at one end a hooked or configured portion 153 which is received in a keyhole slot 155 formed in the upright flange 83 of the left-hand support 43, which slot and connection affords a pivot for movement of the rod 145 between storage and retaining positions as described in connection with the rod 143. The free hooked end 157 of the rod hooks over the other end of the pickup means as will be clear.

Releasable locking of the rod 145 in its storage position is accomplished by releasable locking means including a spring clip 159 welded or otherwise rigidly secured to the upright flange 99 of the rear portion of the left-hand support 41 (Fig. 6).

The relationship of the clip 159 to the flange 99 is such that the rod 145 may be forcibly inserted and withdrawn, the clip exerting sufficient force to retain the rod in storage position during operation yet permitting manual withdrawal of the rod for swinging to retaining position.

The same is true of the rod 145, a retaining clip being visible at 161 in Figs. 1, 2, and 3.

Other features and advantages of the invention, which have not been specifically pointed out herein, will readily occur to those skilled in the art, as will various alterations and modifications in the preferred embodiment of the invention as illustrated, all of which may be achieved without departure from the spirit and scope of the invention.

What is claimed is:

1. A windrow pickup attachment for a harvester platform bordered at opposite sides respectively by fore-and-aft side sheets and having a transverse leading edge and a transverse rear edge spaced higher than the leading edge, said attachment comprising: a pair of transversely spaced, fore-and-aft elongated supports separate from the side sheets, each having a lower front end portion and extending upwardly and rearwardly to an upper rear end portion, said end portions on each support being positionable respectively adjacent to the leading edge and rear edge of the platform; a pair of front securing means for detachably securing the lower front end portions of the supports to the platform front edge; a pair of rear securing means for detachably securing the upper rear end portions of the supports to the platform rear edge; a pair of brackets, one on the lower front end portion of each support, each bracket having a bearing and said bearings being transversely coaxial; and pickup means carried by the supports and extending transversely across and ahead of the platform and including shaft means journaled in the bearings.

2. The invention defined in claim 1, in which: the pickup means projects forwardly from the shaft means in a normal operating position; the shaft means affords a transverse axis about which the pickup means is hinged for upward swinging to a transport position; and retaining means having a first part connected to at least one of the supports and a second part engageable with the transport-positioned pickup means to releasably retain said pickup means in said transport position.

3. The invention defined in claim 2, in which: at least said one support is of L-shaped section, having a transverse flange and an integral upright flange, said upright flange having a keyhole slot therein; and the retaining means first part is releasably received by said slot.

4. The invention defined in claim 2, in which: the connection of the first part of the retaining means to said one support includes a pivot enabling swinging of the retaining means from a forwardly extending pickup-engaging position to a rearwardly retracted storage position lying generally alongside said one support; and means is cooperative between said one support and the retaining means for releasably holding the retaining means in said storage position.

5. The invention defined in claim 1, in which: each support has an arm rigidly affixed to and depending from its lower front end portion independently and ahead of the platform leading edge, each arm having a free lower end below the pickup means; and a pair of spring means resiliently sustains the pickup means on the arms, one spring means being connected to and extending upwardly and forwardly from the free end of each arm and being connected to the proximate portion of the pickup means.

6. The invention defined in claim 5, in which: the pickup means projects forwardly from the shaft means in a normal operating position; the shaft means affords a transverse axis about which the pickup means is hinged for upward and rearward swinging to a generally upright transport position; the spring means are disconnectible to enable transport positioning of the pickup means; and retaining means has a first part connected to at least one of the supports and a second part engageable with the transport-positioned pickup means to releasably retain said pickup means in said transport position.

7. A windrow pick-up attachment for a harvester platform bordered at its opposite sides respectively by fore-and-aft side sheets and having a transverse leading edge and a transverse rear edge spaced higher than the leading edge and transverse conveyor means extending between the side sheets and lying intermediate the leading and rear edges and at a level below that of the rear edge, said attachment comprising: a pair of transversely spaced, fore-and-aft elongated supports separate from the side sheets, each having a lower front end portion positioned adjacent to the leading edge of the platform and each curving upwardly and rearwardly over the conveyor means to an upper rear end portion adjacent to the rear edge of the platform; a pair of front securing means for detachably securing the lower front end portions of the supports to the platform front edge independently of the side sheets; a pair of rear securing means for detachably securing the upper rear end portions of the supports to the platform rear edge; a pair of brackets, one on the lower front end portion of each support, each bracket having a bearing and said bearings being transversely coaxial; and pick-up means carried by the supports and extending transversely across and ahead of the platform and including shaft means journaled in the bearings.

8. A windrow pick-up attachment for a harvester platform bordered at its opposite sides respectively by fore-and-aft side sheets and having a transverse leading edge and a transverse rear edge spaced higher than the leading edge and transverse conveyor means extending between the side sheets and lying intermediate the leading and rear edges and at a level below that of the rear edge, said attachment comprising: a pair of transversely spaced, fore-and-aft elongated supports separate from the side sheets, each having a lower front end portion positioned adjacent to the leading edge of the platform and each curving upwardly and rearwardly over the conveyor means to an upper rear end portion adjacent to the rear edge of the platform; a pair of front securing means for detachably securing the lower front end portions of the supports to the platform front edge independently of the side sheets; a pair of rear securing means for detachably securing the upper rear end portions of the supports to the platform rear edge; and pick-up means carried by the supports and extending transversely across and ahead of the platform.

References Cited in the file of this patent

UNITED STATES PATENTS

| 1,693,475 | Clapper | Nov. 27, 1928 |
| 1,863,637 | Richardson | June 21, 1932 |
| 2,302,881 | Oehler | Nov. 24, 1942 |
| 2,363,888 | Martin | Nov. 28, 1944 |
| 2,524,196 | Hyman | Oct. 3, 1950 |